Patented Nov. 14, 1944

2,362,900

UNITED STATES PATENT OFFICE 2,362,900

PRODUCTION OF CELLULOSE ETHERS

Walter Henry Groombridge and John Downing, Spondon, near Derby, England

No Drawing. Application September 16, 1942, Serial No. 458,568. In Great Britain September 11, 1941

4 Claims. (Cl. 260—231)

This invention is concerned with improvements in the production of cellulose derivatives and particularly in the production of cellulose ethers.

In the development of a satisfactory industrial process for the production of cellulose ethers, particularly ethers which are soluble in organic solvents, there are a number of considerations to be borne in mind. In the first place, if the process is to be economic the amount of alkali and of etherifying agent required must not be excessive and a large proportion of by-products must not be produced. Again, the cellulose ether produced by the process should be as uniform as possible and not consist of a mixture of cellulose ethers of widely differing solubility properties.

It has been discovered that better results are obtained from the above points of view by incorporating the alkali and etherifying agent required in the etherification mixture in a number of stages instead of having the total quantities required present at the beginning of the reaction, provided that certain other conditions, which are discussed below, are observed. The alkali and etherifying agent may be introduced continuously during the reaction or they may be introduced from time to time. The amount of alkali present at any time should not exceed about 2 to 2.5 mols for each $C_6H_{10}O_5$ unit of cellulose and should be chemically equivalent to, or slightly more than chemically equivalent to, the amount of etherifying agent present. Moreover, it is important that the alkali present should be concentrated so that the etherification mixture contains a molecular ratio of alkali to water of at least 2 to 3. Preferably the mixture is anhydrous or substantially so, particularly at the beginning of etherification. For example, when sodium hydroxide, which is the preferred alkali, is employed, a ratio of at least nine parts of sodium hydroxide to one part of water by weight is desirable.

The invention will be described with particular reference to the production of ethyl cellulose which is soluble in organic solvents from alkali-cellulose using diethyl sulphate as etherifying agent and sodium hydroxide as the alkali, since this is the process with which the present application is particularly concerned. The invention is not, however, limited to such a process but is applicable generally to the production of cellulose ethers using appropriate etherifying agents in the presence of alkali. For example, methyl cellulose may be produced using dimethyl sulphate and potassium hydroxide.

The total amounts of alkali and etherifying agent employed may vary, e. g. from 2 to 7 molecular equivalents of each, per $C_6H_{10}O_5$ unit of cellulose, according to the ether content of the desired product.

The production of the alkali-cellulose may be effected by various methods. For example, cotton linters, wood pulp or other cellulosic material may be mixed with a solution of sodium hydroxide of the required concentration, and excess solution, if any, may then be removed by subjecting the impregnated cellulose to pressure. It is, however, somewhat difficult to obtain thorough and uniform impregnation of cellulose with sodium hydroxide solutions of the high concentrations which should be present during etherification if the best results are to be obtained by the present process, and it has been found preferable to impregnate the cellulose with a relatively dilute solution of sodium hydroxide, for example a solution containing 15, 20 or 30% of sodium hydroxide, and then, after removal of any excess solution, to concentrate the alkali on the cellulose, particularly by azeotropic distillation. Preferably, such an operation is carried out using an azeotroping liquid which is suitable for use as an inert medium in the subsequent etherification. Aromatic hydrocarbons, for example benzene, xylene and particularly toluene, are very suitable for this purpose. For example, the cellulose may be steeped in an excess of a 20% aqueous solution of sodium hydroxide at atmospheric temperature for about 10–20 minutes, after which the impregnated cellulose is pressed until it contains the required amount of alkali and is then introduced into a suitable vessel, together with toluene in an amount equal to about 10–20 times the weight of the original cellulose, and azeotropic distillation carried out until the required degree of concentration of the alkali has been effected. Alternatively, the cellulose may be dispersed in toluene, a dilute aqueous solution of sodium hydroxide introduced into and well stirred with the dispersion and azeotropic distillation then carried out. Usually the conditions employed for the production of the alkali-cellulose should be such that an alkali-cellulose containing from 1 to 2 up to about 2.5 mols of sodium hydroxide per $C_6H_{10}O_5$ unit of cellulose is obtained and that the concentration of the sodium hydroxide, considered as a solution in any water present, is at least 60% and is preferably considerablly higher, for example 80 or 90% or more.

After the alkali-cellulose has been prepared the first stage of etherification is carried out, preferably in the presence of an inert diluent, by introducing an amount of diethyl sulphate chemically equivalent, or slightly less than chemically equivalent, to the sodium hydroxide present and heating the etherification mixture at a suitable temperature, for example 100–120° C. As indicated above, toluene is very suitable, both as an azeotroping agent and as an inert diluent, and it is therefore very convenient to carry out the azeotroping operation with toluene and then to effect etherification by incorporating diethyl sulphate with the alkali-cellulose, together with further toluene if necessary, and refluxing the reaction mixture until substantially all of the diethyl sulphate has been exhausted, which usually takes about 1–2 hours. A further quantity of sodium hydroxide amounting e. g. to 1 to 2 mols per $C_6H_{10}O_5$ unit of cellulose is then introduced. Preferably, it is introduced in the form of a relatively dilute aqueous solution and concentrated by azeotropic distillation, for example until the concentration is 80 or 90% or more. When this stage is reached a further amount of diethyl sulphate, chemically equivalent or slightly less than chemically equivalent to the sodium hydroxide, is introduced and etherification continued as in the first stage of the process. The operations described above may then be repeated one or more times until an ether having the required ethoxy content, e. g. 35, 40 or 45% ethoxy, is obtained.

If it is desired to produce an ether having as high a viscosity as possible it is desirable to carry out the production of the alkali-cellulose and the etherification stages in an inert atmosphere, for example in an atmosphere of nitrogen.

The following examples are given to illustrate the invention:

*Example I*

162 parts (1 mol) of wood pulp are steeped in a bath of 20% aqueous sodium hydroxide for about 10 minutes at atmospheric temperature and the impregnated material is then pressed until it contains about 200 parts of the sodium hydroxide solution, which corresponds with about one mol of sodium hydroxide based on the cellulose. The impregnated cellulose is then introduced into a reaction vessel provided with a stirrer and a reflux condenser and about 3000 parts by weight of toluene is added. The sodium hydroxide present is concentrated by azeotropic distillation at the boiling point until an anhydrous alkali-cellulose is obtained, the toluene which is distilled over being separated from the water and fed back to the vessel. 77 parts (0.5 mol) of diethyl sulphate are then added and heating at the boiling point is continued for about two hours. 200 parts of 20% sodium hydroxide are then added and concentration of the hydroxide until it is anhydrous again effected by azeotropic distillation as described above, after which another 77 parts of diethyl sulphate are introduced and the reaction continued for about 2 hours at the boiling point. These operations are repeated until about 4 mols of sodium hydroxide and 2 mols of diethyl sulphate have been reacted. The ethyl cellulose is then separated from the other constituents of the reaction mixture, purified and dried.

*Example II*

The production of ethyl cellulose is carried out as described in Example I with the exception that the wood pulp is dispersed in the toluene and the first amount of sodium hydroxide solution is introduced into the toluene and concentrated by azeotropic distillation prior to the introduction of the diethyl sulphate.

*Example III*

The production of ethyl cellulose is carried out as described in Example I or II, with the exception that the amounts of sodium hydroxide and diethyl sulphate introduced in the first stage are increased to two mols and one mol respectively and the process is completed in two further stages using one mol of alkali and 0.5 mol of diethyl sulphate at each stage.

Having described our invention what we desire to secure by Letters Patent is:

1. Process for the production of cellulose ethers, which comprises treating cellulose with an aqueous solution of alkali containing an amount of alkali greater than that which is molecularly equivalent to the cellulose, removing the alkali in excess of a substantially 1:1 molecular ratio relative to the cellulose, adding an azeotroping inert liquid to the mixture and azeotropically distilling off the water present from the alkali-treated cellulose, separating the azeotroping liquid from the water and returning the azeotroping liquid to the treated cellulose, introducing an etherifying agent therein in a chemically equivalent proportion to the alkali present, heating the reaction mixture until substantially all the etherifying agent has reacted, adding additional aqueous alkali to the reaction mixture in a substantially 1:1 molecular ratio relative to the cellulose, azeotropically distilling off the water, separating the azeotroping liquid from the water and returning the azeotroping liquid to the reaction mixture, adding a further chemically equivalent proportion of etherifying agent thereto relative to the alkali present, heating the reaction mixture until substantially all of said etherifying agent has reacted, and repeating said sequence of operations for at least two more reaction stages.

2. Process for the production of cellulose ethers, which comprises treating cellulose with an aqueous solution of sodium hydroxide containing an amount of sodium hydroxide greater than that which is molecularly equivalent to the cellulose, removing the sodium hydroxide in excess of a substantially 1:1 molecular ratio relative to the cellulose, adding an azeotroping inert liquid to the mixture and azeotropically distilling off the water present from the alkali-treated cellulose, separating the azeotroping liquid from the water and returning the azeotroping liquid to the treated cellulose, introducing an etherifying agent therein in a chemically equivalent proportion to the sodium hydroxide present, heating the reaction mixture until substantially all the etherifying agent has reacted, adding additional aqueous sodium hydroxide to the reaction mixture in a substantially 1:1 molecular ratio relative to the cellulose, azeotropically distilling off the water, separating the azeotroping liquid from the water and returning the azeotroping liquid to the reaction mixture, adding a further chemically equivalent proportion of etherifying agent thereto relative to the sodium hydroxide present, heating the reaction mixture until substantially all of said etherifying agent has reacted, and repeating said sequence of operations for at least two more reaction stages.

3. Process for the production of cellulose ethers, which comprises treating cellulose with an aqueous solution of sodium hydroxide containing an amount of sodium hydroxide at least molecularly equivalent to the cellulose, removing any sodium hydroxide in excess of a substantially 1:1 molecular ratio relative to the cellulose, adding toluene to the mixture and heating the latter to azeotropically distill off the water present from the alkali-treated cellulose, separating the toluene from the water and returning it to the reaction mixture, introducing diethyl sulfate therein in a chemically equivalent proportion to the sodium hydroxide present, heating the reaction mixture until substantially all the diethyl sulfate has reacted, adding additional aqueous sodium hydroxide to the reaction mixture in a substantially 1:1 molecular ratio relative to the cellulose, azeotropically distilling off the water present, separating the toluene from the water and returning the toluene to the reaction mixture, adding a further chemically equivalent proportion of diethyl sulfate thereto relative to the sodium hydroxide present, heating the reaction mixture until substantially all of said diethyl sulfate has reacted, and repeating said sequence of operations for at least two more reaction stages.

4. Process for the production of cellulose ethers, comprising treating cellulose with an aqueous solution of sodium hydroxide containing an amount of sodium hydroxide at least molecularly equivalent to the cellulose for about 10 minutes at atmospheric temperature, removing any sodium hydroxide in excess of substantially 1:1 molecular ratio relative to the cellulose, adding toluene to the mixture and heating the latter to azeotropically distill off the water present from the alkali-treated cellulose, separating the toluene from the water and returning it to the reaction mixture, introducing diethyl sulfate therein in a chemically equivalent proportion to the sodium hydroxide present, heating the reaction mixture at the boiling point for about 2 hours, adding additional aqueous sodium hydroxide to the reaction mixture in a substantially 1:1 molecular ratio relative to the cellulose, azeotropically distilling off the water present, separating the toluene from the water and returning the toluene to the reaction mixture, adding a further chemically equivalent proportion of diethyl sulfate thereto relative to the sodium hydroxide present, heating the reaction mixture at the boiling point for about 2 hours, and repeating said sequence of operations for at least two more reaction stages.

WALTER HENRY GROOMBRIDGE.
JOHN DOWNING.